United States Patent
Shah et al.

(10) Patent No.: US 8,069,468 B1
(45) Date of Patent: Nov. 29, 2011

(54) CONTROLLING ACCESS TO INFORMATION OVER A MULTIBAND NETWORK

(75) Inventors: Pallavi Shah, Mountain View, CA (US); Keith Deutsch, Palo Alto, CA (US); Gerard Fernando, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1118 days.

(21) Appl. No.: 09/551,523

(22) Filed: Apr. 18, 2000

(51) Int. Cl.
*H04L 9/00* (2006.01)

(52) U.S. Cl. .............................................. 726/2; 725/91

(58) Field of Classification Search .................. 709/231; 345/687; 380/210–212, 239, 220, 34, 262; 725/4.9, 20, 27–29, 54, 63–70, 94–95, 100, 725/111, 114, 118, 120, 131, 138, 87, 91, 725/139, 144, 148, 4, 26, 25, 2; 455/3.02, 455/428, 3.05, 408, 412.2, 464, 500, 63.3, 455/103; 711/206; 726/1–5; 348/14.12, 348/14.1, 14.11, 14.02, 14.13, 38, 119, 156, 348/211.1–211.3, 441, 455–457, 474, 558, 348/568, 705, 716; 307/81; 375/140, 146, 375/220, 316, 344, 349; 379/10.01, 16; 370/252, 370/264, 299, 329, 341, 464
See application file for complete search history.

(56) References Cited

U.S. PATENT DOCUMENTS

| | | | | |
|---|---|---|---|---|
| 4,780,885 A * | 10/1988 | Paul et al. | ...................... | 375/267 |
| 5,081,705 A * | 1/1992 | Swanke | ........................... | 455/73 |
| 5,225,902 A * | 7/1993 | McMullan, Jr. | ............... | 725/121 |
| 5,231,665 A * | 7/1993 | Auld et al. | ..................... | 380/241 |
| 5,235,619 A * | 8/1993 | Beyers et al. | ................ | 375/260 |
| 5,255,086 A * | 10/1993 | McMullan et al. | ........... | 725/131 |
| 5,323,447 A * | 6/1994 | Gillis et al. | .................... | 455/464 |
| 5,481,757 A * | 1/1996 | Mihara et al. | ................. | 725/119 |
| 5,521,967 A * | 5/1996 | Novas et al. | ............. | 379/100.14 |
| 5,523,997 A * | 6/1996 | Bishop, Jr. | ..................... | 455/428 |
| 5,586,193 A * | 12/1996 | Ichise et al. | ................... | 381/106 |
| 5,697,047 A * | 12/1997 | Nicholson | ..................... | 725/114 |
| 5,748,147 A * | 5/1998 | Bickley et al. | ................ | 342/457 |
| 5,802,453 A * | 9/1998 | Kuroki et al. | ............... | 340/7.26 |

(Continued)

*Primary Examiner* — Kim Vu
*Assistant Examiner* — Leynna Truvan
(74) *Attorney, Agent, or Firm* — Meyertons, Hood, Kivlin, Kowert & Goetzel, P.C.

(57) ABSTRACT

A method and apparatus for controlling access to information over a network. Information and video/audio streams are transmitted across a network by a head end to a member space manager or set-top box where the information may be utilized or viewed. The frequency that a given stream of information is transmitted on is rotated or switched based on a switching algorithm. For example, a given stream (e.g., a motion picture on a pay-per-view station) may be transmitted on one frequency for a specified time interval, then switched to another frequency for a specified time interval, etc. To enable the member space manager to determine which frequency a given stream of information is transmitted on at a particular point in time, switching software may be provided by the head end server to the member space manager. Switching software may be encrypted prior to transmission to the member space manager. According to one or more embodiments of the invention, the stream-to-frequency mapping is determined, the mapping is transmitted to the member space manager where it is installed and executed, the stream of information is transmitted on varying frequencies to the member space manager, and the member space manager tunes into the appropriate frequency to receive and utilize a continuous stream of information. By transmitting information in this manner, all encryption, frequency/channel switching, configuration issues, etc. are transparent to the end user who merely has to select a virtual channel to view.

38 Claims, 6 Drawing Sheets

U.S. PATENT DOCUMENTS

| | | | |
|---|---|---|---|
| 5,887,243 A * | 3/1999 | Harvey et al. | 725/136 |
| 5,959,677 A * | 9/1999 | Date et al. | 375/240.01 |
| 5,960,028 A * | 9/1999 | Okamoto et al. | 375/130 |
| 6,112,249 A * | 8/2000 | Bader et al. | 709/239 |
| 6,223,287 B1 * | 4/2001 | Douglas et al. | 713/178 |
| 6,240,555 B1 * | 5/2001 | Shoff et al. | 725/110 |
| 6,385,585 B1 * | 5/2002 | Jonsson et al. | 704/275 |
| 6,396,814 B1 * | 5/2002 | Iwamura et al. | 370/256 |
| 6,404,753 B1 * | 6/2002 | Chien et al. | 370/337 |
| 6,473,128 B1 * | 10/2002 | Berger | 348/461 |
| 6,477,197 B1 * | 11/2002 | Unger | 375/222 |
| 6,477,649 B2 * | 11/2002 | Kambayashi et al. | 726/27 |
| 6,483,848 B1 * | 11/2002 | Miura et al. | 370/465 |
| 6,493,878 B1 * | 12/2002 | Kassatly | 725/144 |
| 6,510,189 B1 * | 1/2003 | Hiramatsu et al. | 375/349 |
| 6,530,082 B1 * | 3/2003 | Del Sesto et al. | 725/9 |
| 6,536,043 B1 * | 3/2003 | Guedalia | 725/90 |
| 6,621,789 B1 * | 9/2003 | Missett | 370/225 |
| 6,628,302 B2 * | 9/2003 | White et al. | 345/717 |
| 6,721,958 B1 * | 4/2004 | Dureau | 725/136 |
| 6,778,557 B1 * | 8/2004 | Yuki et al. | 370/468 |
| 6,792,544 B2 * | 9/2004 | Hashem et al. | 726/30 |
| 6,828,993 B1 * | 12/2004 | Hendricks et al. | 715/819 |
| 6,865,160 B1 * | 3/2005 | Bare | 370/256 |
| 6,890,274 B2 * | 5/2005 | Carlton et al. | 473/579 |
| 6,904,110 B2 * | 6/2005 | Trans et al. | 375/350 |
| 6,941,341 B2 * | 9/2005 | Logston et al. | 709/203 |
| 7,096,487 B1 * | 8/2006 | Gordon et al. | 725/91 |
| 7,100,188 B2 * | 8/2006 | Hejna, Jr. | 725/100 |

* cited by examiner

CONTROLLING ACCESS TO INFORMATION OVER A MULTIBAND NETWORK

BACKGROUND OF THE INVENTION

1. Field of the Invention

This invention relates to the field of information networks, and more specifically to controlling access to information over a network.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, JavaTV API, and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Cable T.V. is a common mechanism used to distribute television channels and programs. Cable companies charge a subscriber for access to the various channels and programs distributed (referred to as "basic" cable). Such "basic" cable may be viewed using a cable-ready television. For additional money, a subscriber can pay for premium channels such as HBO, Showtime, and the Movie Channel or specific programs (e.g., movies) using a pay-per-view system. To restrict access to unauthorized viewing of the premium channels (and pay-per-view movies), cable companies scramble the television signals and provide a set-top box (also known as a cable box) which has the ability to descramble the information. However, cable boxes (referred to as "illegal" boxes) that "descramble" or "clarify" unauthorized television signals are often sold and advertised for sale in the back of technical magazines and on the internet. This results in "data theft" because data that should be paid for is obtained for free.

Another area that suffers from data theft is the internet. Like television, some of the information accessible via the internet and world wide web may be subscription based. To prevent unauthorized access to the information, a username and password may be required. However, usernames and passwords and other authorization techniques may be bypassed by hackers and other unauthorized users.

Owners of the information, including cable companies and television stations, desire a way to ensure that unauthorized users do not gain access to information and broadcast signals without authorization. Additionally, a method that is not easily bypassed or worked around using illegal boxes or by hacking is desirable.

To better understand cable and information/television signal distribution, a description of how information is transmitted and the transmission mediums will now be discussed. Currently, information may be shared and provided between various devices (including computers and cable systems) linked together in a network (including a world wide network such as the internet). A network can be a small system that is physically connected by cables (a local area network or "LAN"), or several separate networks can be connected together to form a larger network (a wide area network or "WAN"). Other types of networks include the internet, telcom networks, the World Wide Web, intranets, extranets, wireless networks, and other networks over which electronic, digital, and/or analog data may be communicated. The World Wide Web (WWW) was developed to provide a simpler, more uniform means for accessing information on the Internet. The WWW is an application of the internet that is commonly used to view (by a mechanism referred to as a web browser) and retrieve information (in the form of web pages).

A network may not be limited to the connection of computers and may include the connection of any type of device such as a television or radio (e.g., a cable area). It is desirable to communicate the information to the various devices on a network based on whether that device has proper authorization (e.g., providing television channels to cable subscribers and restricting access to non-subscribers).

As described above, to prevent unauthorized access, prior art mechanisms merely scramble the information prior to transmission and descramble the information for viewing by a particular user (using a cable box). However, regulations that will take effect in the near future restrict the ability to scramble/descramble the information using the current mechanisms available.

The devices on a network may be connected using a variety of mediums. For example, television signals and other information may be transmitted by cable, telephone wire, or by satellite. Various entities may transmit the signal or information. For example, the transmitting entity may include but is not limited to a software developer, a local cable company, a local phone company, a television station, or a motel/hotel operator, etc.

The information transmitted over a network may consist of confidential or copyrighted material for which the owner (or device/entity transmitting the information) may want to limit access. For example, the owner of computer software (e.g., Sun Microsystems Inc.™) or motion picture rights may want to limit the transmission of the computer software or motion picture to particular authorized persons. Similarly, a cable company may want to transmit certain channels for free and require payment for other channels or programs.

As described above, in some cable networks, a viewer or subscriber pays for the level of service/transmission desired. For example, a subscriber may pay one amount for several "basic" channels (a basic subscriber), and may pay additional money for "premium" channels (a premium subscriber). The subscriber can also elect to pay further money for a particular program referred to as "pay-per-view" or "video-on-demand" program. To prevent a subscriber from viewing an unauthorized transmission, numerous schemes have developed.

Information is transmitted across a variety of transmission mediums (e.g., cable, satellite, etc.) in analog form. Most mediums have a spectrum (a given range of transmission frequencies) across which the information may be transmitted. For example, a television signal may be transmitted on an ultra high frequency (UHF) or a very high frequency (VHF) and radio stations may transmit information across a certain frequency range (e.g., 89-108 MHz (megahertz)). A particular channel is transmitted on a particular frequency and remains on that frequency. For example, channel 2 may be assigned to 110 MHz and is always transmitted on the 110 MHz frequency. Thus, the prior art requires the manual assignment of a particular channel (stream of information) to a particular frequency. Thus, channel 2 may be assigned to 110 MHz and channel 4 may be assigned to 145 MHz, etc. With respect to radio, a particular radio station may be assigned to the frequency 106.7 MHz and another station to 98.7 MHz, another to 97.1 MHz, etc. Thus, the prior art provides for manually assigning and setting the transmission for a given stream of information. Manual assignment is necessary because the receiver has no mechanism for determining the transmission frequency of a given channel other than by a passive predetermined arrangement. In addition to transmitting television or other signals in an analog form, digital signals may also be transmitted across similar assigned frequencies.

FIG. 1 illustrates a common prior art scheme for preventing unauthorized access. Transmitter 100 may be a site on the internet (referred to as a web site), a local cable company, a video source, or other transmitter of information. Transmitter 100 transmits the information to scrambler 102 (also referred to as a "head end") where the information (e.g. television signals) are scrambled such that the information cannot be viewed unless descrambled. The scrambled information is then transmitted by satellite, cable or other communication medium 104. The information is then received in a set-top (cable) box 106. Set-top boxes may be distributed by a cable company to subscribers, for example. Inside the set-top box a descrambling mechanism 108 maintains the ability to descramble the information so that it may be viewed. Set-top box 106 may be connected to television 110 for viewing the descrambled information. By utilizing the scheme of FIG. 1, only those end-users with accurately configured set-top boxes may descramble and view the information transmitted from transmitter 100.

Descrambler 108 may be configured to descramble the information in a variety of ways. For example, a key may be utilized by scrambler 102 to scramble the information and applied to descrambler 108 to descramble the information. The key may be changed from time to time, transmitted to the set-top box (or a decoder within the set-top box) and applied to the descrambler by the set-top box (or decoder). The key may be transmitted as a data signal within the normal television transmission. Normal television signals have a vertical blanking interval (VBI) in each field and a horizontal blanking interval (HBI) in each line between the chrominance and luminance signals. The key may be transmitted within either the VBI or HBI.

Pay-per-view programs provide the user with the ability to pay for a specific program or channel for a specific period of time. For descrambler 108 to descramble a specific program, each set-top-box 106 or descrambler 108 may have a unique address that permits transmitter 100 to selectively communicate with it. A program tag may be transmitted with the television signal that identifies a particular location in the memory of descrambler 108, for example. The memory location of descrambler 108 stores information regarding whether that particular user is authorized or not authorized to receive the particular program. The set-top-box 106 or descrambler 108 may communicate with transmitter 100 and the memory location may be updated to provide for the reception of the particular program. Thus, programs may be viewed on an individual basis.

Transmitted information may be transmitted in a variety of manners. For example, the information may be transmitted in (1) a straight non-scrambled mode (e.g., scrambler 102 may not modify the signal); (2) a first scrambled mode where the content of all odd-numbered display lines in each frame are inverted while remaining lines are noninverted; and (3) a second scrambled mode wherein the content of all even-numbered display lines in each frame are inverted while remaining display lines are noninverted. Further, this scrambling may be performed on a program by program, or channel by channel basis. However, using any of these transmission examples, it is easy for someone to examine the odd numbered display lines and even numbered display lines and create an unauthorized descrambling device that will enable viewing of all of the channels. A method for preventing unauthorized access or viewing of information transmitted over a network that is not easily bypassed is desired.

SUMMARY OF THE INVENTION

A method and apparatus for controlling access to information over a network. Data streams (that may include media streams such as television signals, and information streams such as web pages) are transmitted across a network by a head end (e.g., a local cable company) and received by a member space manager or set-top box (also referred to as a cable box) that enables the information to be utilized or viewed on a television. Data streams may be transmitted on a variety of frequencies across cable (or other transmission mediums such as satellite). Prior art methods restrict the transmission of a particular channel to a set frequency (e.g., 110 MHz). Thus, channel 2 is always transmitted across a particular frequency, channel four on another particular frequency, channel 7 on another particular frequency, etc. To prevent unauthorized viewing, the prior art scrambles the transmitted signal. However, an illegal cable box merely has to descramble the information on a particular frequency to view a given channel/program.

One or more embodiments of the invention provide for rotating or switching the frequency that a given data stream is transmitted based on a switching algorithm. For example, a given data stream (e.g., a motion picture on a pay-per-view station) may be transmitted on one frequency for a specified time interval (e.g., 1/10th of a second, 10 seconds, 25 seconds, 1 minute, etc.), then switched to another frequency for a specified time interval (e.g., 1/10th of a second, 10 seconds, 25 seconds, 1 minute, etc.), then switched to another frequency for a specified time interval, etc. Additionally, the switching algorithm may be changed arbitrarily. By switching the frequency, an illegal cable box has to know the frequency order (which can be changed at any time) that a channel is being transmitted on, thereby making it more difficult to view a continuous program.

To enable the member space manager to determine which frequency a given stream of information is transmitted on at a particular point in time, switching software may be provided by the head end server to the member space manager (or set-top box). Switching software may be specific to a particular data stream and may specify which frequency will contain the given stream at a particular point in time. In one or more embodiments, the switching software may be encrypted prior to transmission to the member space manager and decrypted upon arrival. Further, in one or more embodiments of the invention, the switching software is an object oriented object that is dynamically generated by the member space manager (with information received from the head end server) and maintains the ability to communicate with the head end, e.g., via a remote procedure call (RPC) mechanism such as the Java Remote Method Invocation (RMI) system.

According to one or more embodiments of the invention, a mapping that defines which frequency a particular stream maps/corresponds to is determined, the mapping is transmitted to the member space manager where it is installed and executed, the data stream is transmitted on varying frequencies to the member space manager, and the member space manager tunes into the appropriate frequency to receive and utilize a continuous stream of information. By transmitting information in this manner, all encryption, frequency/channel switching, configuration issues, etc. are transparent to the end user who merely has to select a virtual channel (e.g., NBC, ABC, CBS, etc.) to view. Further, illegal viewing of a particular channel is more difficult because once a frequency is tuned into, 1/10th of a second or 10 seconds later, the selected channel is transmitted on a different frequency.

DETAILED DESCRIPTION OF THE INVENTION

The invention is a method and apparatus for controlling access to information over a network. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The following description discloses embodiments of a method for controlling access to information over a network. First, however, a description is given below of an embodiment of computer apparatus suitable for providing an execution environment for the software apparatus of the invention.

Embodiment of Computer Execution Environment (Hardware)

Figure 1:
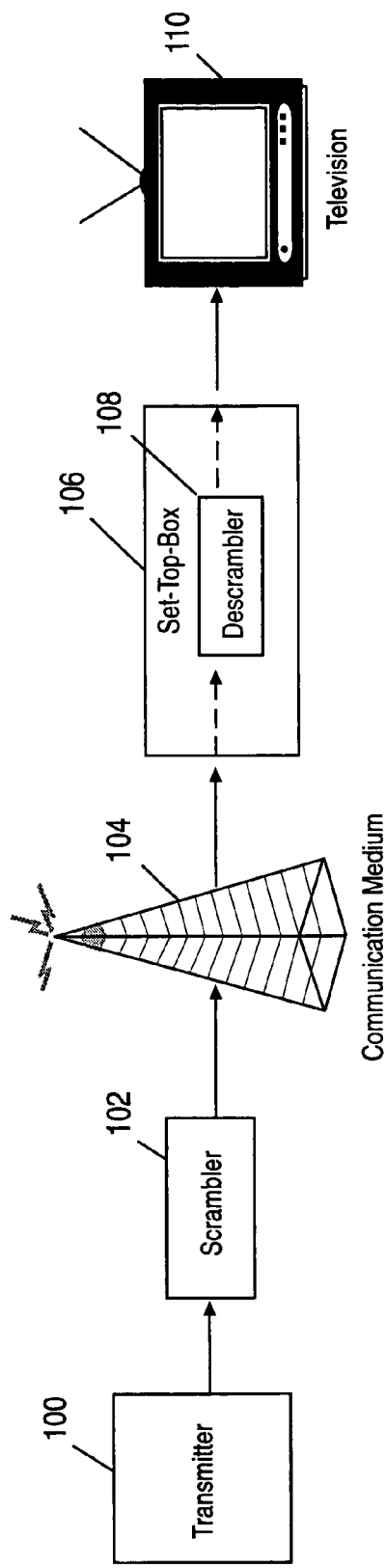
FIG. 1 illustrates a common prior art scheme for preventing unauthorized access.
Figure 2:
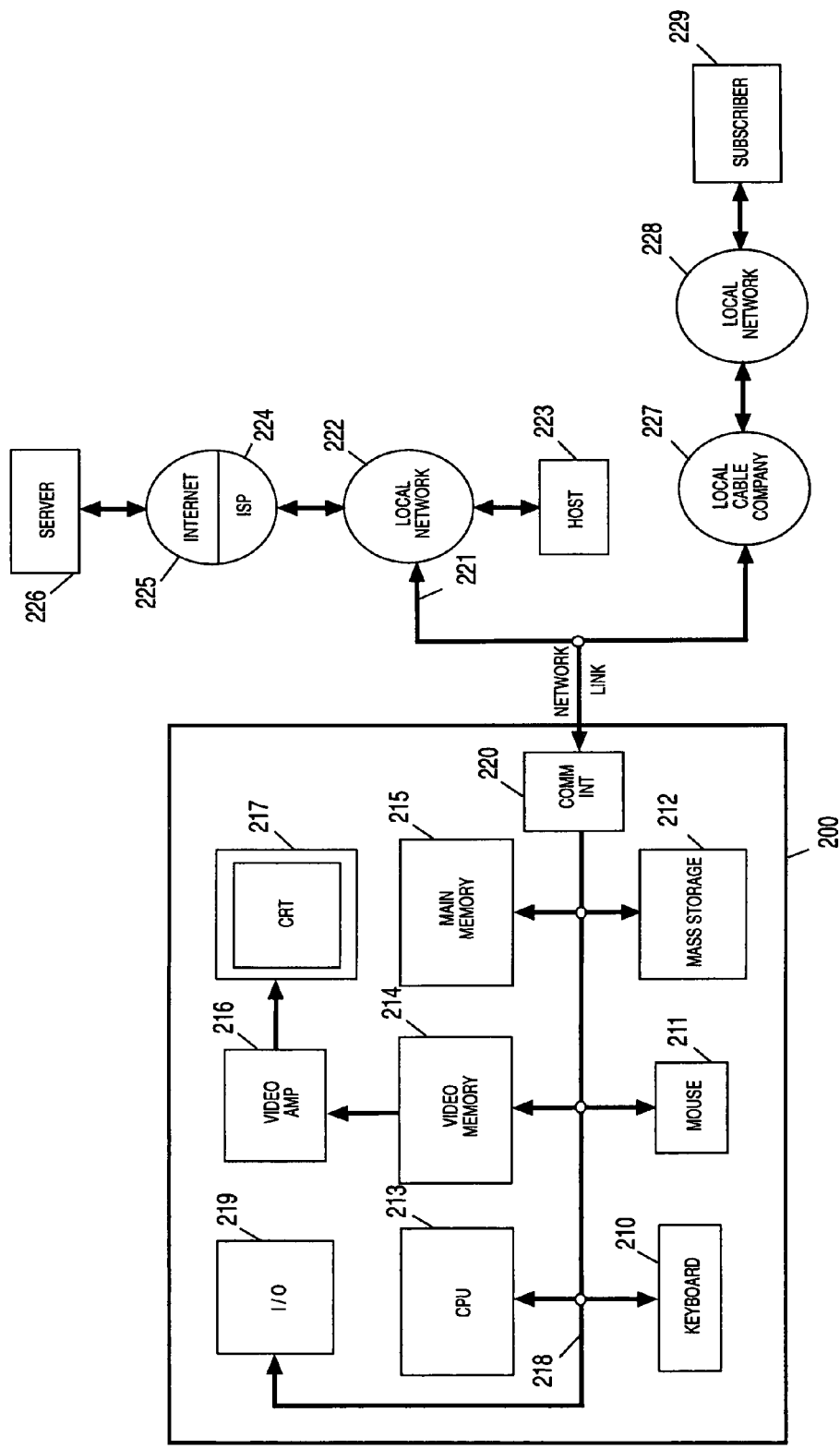
FIG. 2 is a block diagram a computer system capable of providing a suitable execution environment in accordance with one or more embodiments of the invention.

An embodiment of the invention can be implemented as computer software in the form of computer readable code executed on a device such as device/computer 200 illustrated in FIG. 2, or in the form of bytecode class files executable within a Java™ runtime environment running on such a device/computer, or in the form of bytecodes running on a processor (or devices enabled to process bytecodes (such as a set-top box or television)) existing in a distributed environment (e.g., one or more processors on a network). A keyboard 210 and mouse 211 are coupled to a system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to system bus 218 represents such I/O elements as a printer, A/V (audio/video) I/O, etc.

Device 200 includes a video memory 214, main memory 215 and mass storage 212, all coupled to system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 64-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Sun Microsystems, Inc., such as a SPARC™ microprocessor, or a microprocessor manufactured by Motorola, such as the 680×0 processor, or a microprocessor manufactured by Intel, such as the 80×86, or Pentium processor. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images. Device 200 may or may not have all of the constituent parts 210-220 displayed and may not be a computer, but a mechanism for transmitting information such as a television station or cable company.

Device 200 may also include a communication interface 220 coupled to bus 218. Communication interface 220 provides a two-way data communication coupling via a network link 221 to a local network 222 or to a local cable company 227. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information (e.g., television or video/audio streams).

Network link 221 typically provides data communication through one or more networks to other data devices. For example, network link 221 may provide a connection through local network 222 to local server computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. Alternatively, network link 221 may provide a connection to local cable company 227 which transmits information through local network 228 to subscriber 229. The signals through the various networks and the signals on network link 221 and through communication interface 220, which carry the digital data to and from device 200, are exemplary forms of carrier waves transporting the information.

Device 200 can send messages and receive data, including program code, through the network(s), network link 221, and communication interface 220. In the Internet example, remote server computer 226 might transmit a requested code for an application program through Internet 225, ISP 224, local network 222 and communication interface 220. In the cable television example, local cable company 227 transmits video/audio in the form of channels or streams of information through local network 228 to the end subscriber 229 who may display the information on a television.

The received code may be executed by processor 213 as it is received, and/or stored in mass storage 212, or other non-volatile storage for later execution. In this manner, device 200 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The systems described above are for purposes of example only. An embodiment of the invention may be implemented in any type of system, computer system, or programming or processing environment.

Embodiment of Software Apparatus for a Controlling Access to Information

An embodiment of the invention includes software apparatus comprising a method for controlling access to information over a network. The access control may be implemented utilizing instances of object classes in accordance with known object-oriented programming practices. An overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects. The encapsulation provided by objects in an object-oriented programming environment may be extended to the notion of channels or video/audio steams.

Implementation in the Java Programming Language

Embodiments of the invention may be implemented in any type of programming language (object oriented or otherwise) including but not limited programming languages such as Java, FORTRAN, Pascal, Assembly Language, C, C++, Small Talk, ADA, LISP, or Visual Basic. The description, examples, and implementations described below may refer to or utilize the Java programming language or the Java TV™ application programming interface (API), but the invention is not limited to use of the Java programming language or Java TV API and may be implemented in any type of programming language. Embodiments of the invention may be implemented using the Java TV API which enables a set-top box or digital television to receive interactive television content such as enhanced television, video-on demand, electronic programming guides, and interactive multi-camera-angle sporting events. The Java TV API is an extension of the Java platform and the standard options available in the Java programming language.

The Java programming language is an object-oriented programming language with each program comprising one or more object classes. Unlike many programming languages, in which a program is compiled into machine-dependent, executable program code, Java classes are compiled into machine independent bytecode class files. Each class contains code and data in a platform-independent format called the class file format. The computer system acting as the execution vehicle supports the Java runtime environment. The runtime environment contains a program called a virtual machine, which is responsible for executing the code in Java classes.

Applications may be designed as standalone Java applications, or as Java "applets" which are identified by an applet tag in an HTML document, and loaded by a browser application. The class files associated with an application or applet may be stored on the local computing system, or on a server accessible over a network. Each class is loaded into the Java runtime environment, as needed, by the "class loader."

Java classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Embodiments of the software apparatus may be implemented using any programming language including standard OOP object classes. For the purposes of the following description, references to software, software objects and channel control software may refer to instances of OOP object classes.

Implementation of Software Apparatus for Controlling Access to Information Over a Network As described above, the invention may be implemented in any programming language and examples and descriptions that utilize the Java programming language are examples of one or more embodiments of the invention.

Data Stream Switching

Figure 3:
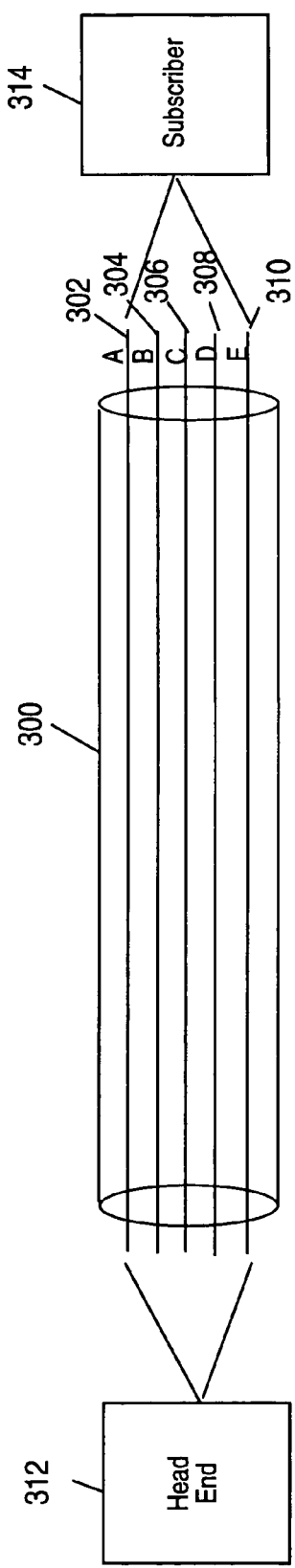
FIG. 3 illustrates a communication mechanism between a head end and a subscriber according to one or more embodiments of the invention.

A stream of data or information may consist of a particular channel (e.g., CNN, ESPN, NBC, etc.) or a particular program(s) (e.g., a pay-per-view program, weekend access for a channel, etc.). One or more embodiments of the invention provide for alternating or switching the information for a particular stream of data across one or more frequency bands/communication paths. A communication path includes frequency bands and any other mechanism through which information is transmitted/communicated. FIG. 3 illustrates a communication mechanism between a head end and a subscriber according to one or more embodiments of the invention. Cable or communication medium 300 may consist of a variety of frequency bands A-E (302-310). Head End 312 transmits information such as a stream of data across communication medium 300 where it will eventually reach subscriber 314. The stream may be transmitted on one frequency band such as band B 304. Alternatively, the stream may be transmitted on alternating bands. For example, a stream may be transmitted on band A 302 for a specified time period (e.g., one minute, 1/10th of a second, etc.), then on band E 310 for a specified time period (e.g., 30 seconds, 2 seconds, etc.), then on band B 304 for a specified time period (e.g., one minute, 20 seconds, etc.), etc. By alternating the frequency band that the stream is transmitted on, subscriber 314 cannot view the stream without knowing which band the stream will be transmitted on (thereby preventing unauthorized access). The stream may be transmitted across numerous alternating frequency bands in a variety of manners as long as subscriber 314 knows which band the stream will be transmitted on. Thus, a stream (piece of media) can reside on various frequencies at various times in accordance with a given sequence/pattern of frequencies/communication paths.

Subscriber Processing of Data Streams

Figure 4:
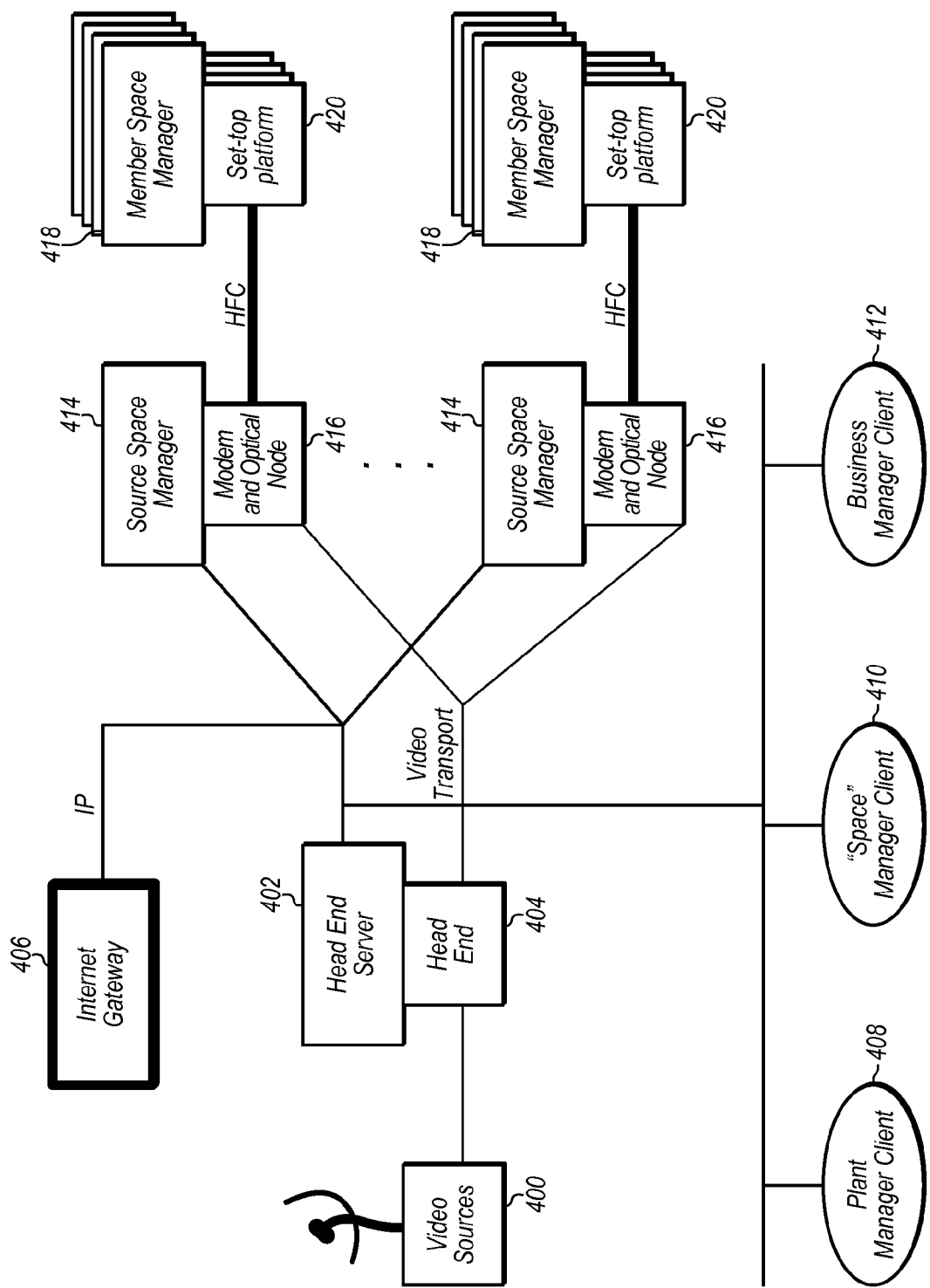
FIG. 4 illustrates the elements of a mechanism for controlling access to information over a network according to one or more embodiments of the invention.

FIG. 4 illustrates the elements of a mechanism for controlling access to information over a network according to one or more embodiments of the invention. Video sources 400 provide the video/audio/information content that is to be distributed. For example, video sources 400 may be a television station or a web host that provides the television show or HTML/graphics respectively. Head end server 402 has a controlling relationship to head end 404 and is responsible for various functions (head end server 402 and head end 404 may be used interchangeably throughout the description of one or more embodiments of the invention). For example, head end server 402 may provide the means to attach, detach, update, and retrieve data from an external application. Additionally, head end server 402 or head end 404 may provide the means to control channel/frequency bindings. In other words, head end server 402 or head end 404 may bind a particular channel or stream to a particular frequency band (i.e., head end server 402 or head end 404 provides a mapping between a stream and a particular physical channel (band)). Head end server 402 may also ensure that the various subscribers are connected to the head end server and the information transmitted is concurrent amongst the subscribers. Additionally, head end server 402 and head end 404 may provide external internet access and higher level network services, and may provide the interface through which Web applications gain access to various control mechanisms such as channel/frequency bindings, auto-switching functions, usage data, and preventive and situational diagnostics.

Head end server 402 and head end 404 communicate with one or more source space managers 414 and one or more member space managers 418. Each source space manager 414 is connected to and responsible for a single head end optical node 416 and provides the application server for the service area associated with node 416. Thus, for a service area (referred to as a member space), with a defined set of subscribers or members, source space manager 414 is responsible for (1) modem and optical node 416 (that provides the ability to communicate across a network); and (2) a server that provides for the configuration for all members in the designated member space (e.g., source space manager 414 determines the hardware and software configuration for each member and may maintain a database of such configuration information). Source space manager 414 may also ensure that needed updates to any software on or by its member space managers 418 are performed accurately and timely. The head end server 402 and source space manager 414 may be treated as logically distinct functions and may be implemented in separate machines. However, in one or more embodiments, the head end server 402 and the source space manager 414 may be implemented within a common code set on a single machine.

Each member space manager 418 is associated with a set-top platform 420 that is connected to a member/subscriber's television, for example. Member space manager 418 and set-top platform 420 may be discussed interchangeably with respect to one or more embodiments of the invention. Member space manager 418 is configured to deliver a stream of information to a subscriber/member regardless of which frequency band the stream is received on. Consequently, member space manager 418 maintains the knowledge provided from head end server 402 and source space manager 414 regarding the mapping between streams/channels and frequency bands for a particular point in time. For example, if a subscriber selects ESPN as the desired channel, member space manager 418 determines which frequency band to read at which point in time in order to receive the entire stream of ESPN. In essence, member space manager 418 is unswitching the streams of data from the varying frequency bands that head end server 402 is transmitting the stream on.

The data streams may be transmitted across internet gateway 406 using an specific internet protocol (IP) communication system. A protocol is a set of standardized rules for exchanging the information between the computers. Protocols generally specify the data format, timing, sequencing, and error checking of data transmissions. In one or more embodiments of the invention, an IP communication system (an IP channel) is combined with a multiplicity of video/audio channels (e.g., traditional cable system) to create a control channel. A control channel may be utilized to broadcast traditional media and internet information (and files). Consequently, software may be transmitted by the control channel and executed on a computer or device enabled to execute the software. By controlling the transmission of all information across a control channel, a given piece of information/media can reside on various channels at various times.

In addition to the above components, a plant manager 408, space manager 410, and business manager 412 may be utilized. For example, plant manager 408 may provide access to services regarding the communication and status of communication such as preventive and situational diagnostics, quality of service monitoring, automatic service alerts, graceful plant degradation strategies, and bandwidth allocation. Space manager 410 may provide the means to monitor and update any additional applications on the network such as an application where complex sets of digital media and graphics, Java programming language based intelligence and interactivity, and advanced networking are integrated into and distributed in a 3D spatial context (referred to as a "MediaSpaces™ Java framework"). Business manager 412 may provide access to business and marketing issues relating to application based services such as the gathering of usage statistics.

Figure 5:
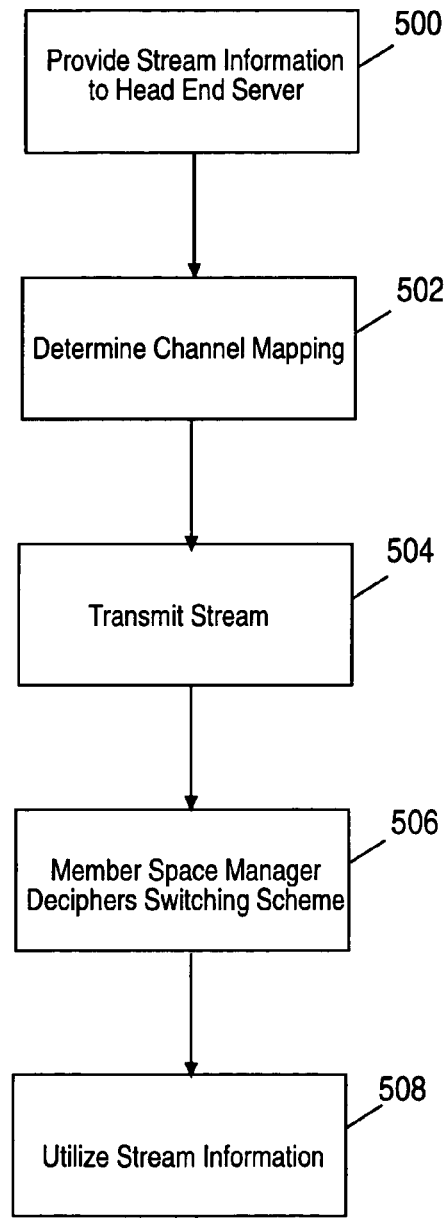
FIG. 5 demonstrates the flow of information to the member subscriber according to one or more embodiments of the invention.

FIG. 5 demonstrates the flow of information to the member subscriber according to one or more embodiments of the invention. At step 500 the stream information is provided to head end 402. Head end 402 utilizes a switching scheme and determines the appropriate channel mapping at step 502. At step 504 the stream is transmitted on various frequency bands according to the switching scheme. At step 506, member space manager 418 receives the transmission and deciphers the switching scheme to determine how to obtain and utilize a stream of information. At step 508, the stream of information is utilized. Utilization of the stream may be by displaying the video/audio stream on a television, or may be displaying a web page on a computer, for example. Thus, streams of information may be distributed across a network and utilized by an end-user such as a cable subscriber or computer user.

Figure 6:
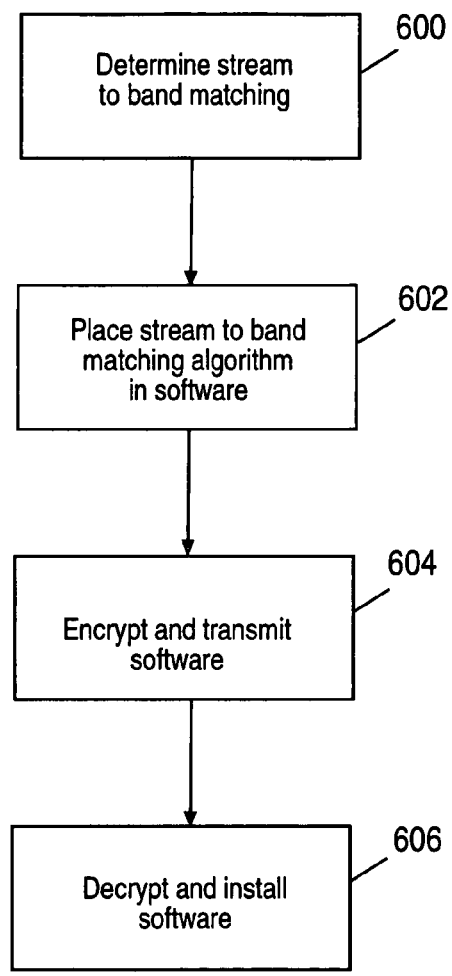
FIG. 6 illustrates a method for enabling the deciphering of a switching algorithm and providing a constant stream of data to an end-user according to one or more embodiments of the invention.

The ability for member space manager 418 to decipher the switching scheme may be accomplished in a variety of manners. FIG. 6 illustrates a method for enabling member space manager 418 to decipher a switching algorithm and provide a continuous stream of data to a viewer/end-user according to one or more embodiments of the invention. At step 600, head end server 402 determines how a particular stream will be transmitted across various bandwidths (e.g., which band a particular stream will be transmitted on at a particular time (i.e., the switching algorithm to be used)). At step 602, the switching algorithm or instructions regarding which channel to tune into at a particular time for a particular stream is placed into software (referred to as "switching software"). For example, the switching software may be in the form of an object oriented object that can initialize itself and contains methods to instruct set-top platform 420 which frequency band to tune into to receive the particular stream. In one or more embodiments, a separate and distinct switching software object may be created for each stream (e.g., channel or program). The switching software may be written in any programming language. In one or more embodiments, the switching software may be written in an object-oriented or scripting language including but not limited to the Java programming language, C++, or SmallTalk. In a Java programming language implementation, member space manager 418 or a television that set-top platform 420 is connected to, may be enabled to execute programs written in the Java programming language.

At step 604, the switching software is transmitted to member space manager 418. In one or more embodiments, the switching software is encrypted prior to transmission. Encryption (also referred to as cryptography) comprises a system for sending information from a sender to a receiver over a medium so that the information is "secure", that is, so that only the intended receiver can recover the information. During encryption information is converted, from a format wherein the information may be viewed without additional effort, into an encrypted format, wherein the information may only be viewed after decryption. The switching software may be encrypted using any type of encryption algorithm including but not limited to public key cryptography or secret key cryptography wherein a "key" is utilized to encrypt the software and the same or a different "key" is used to decrypt the software. Further, in one or more embodiments, the encryption mechanism may be changed if desired.

By encrypting the switching software, only individuals/entities with the decryption software (and the appropriate "key") can utilize the switching software. Consequently, unauthorized users are prevented from installing and utilizing the switching software that provides the frequency-channel mapping and will have extreme difficulty in obtaining a continuous stream of information (by determining which bands contain a channel at a given time). At step 606, member space manager 418 decrypts the switching software and installs the switching software to enable viewing/utilization of a continuous stream. In one or more embodiments, the installation process may include loading a transmitted switching software object at set-top platform 420. Further, the switching software object may be generated dynamically by member space manager 418.

In one or more embodiments, member space manager 418 maintains the ability to communicate with head end server 402. In such an embodiment, head end server 402 communicates with member space manager 418 to properly configure member space manager 418 to receive and tune in a particular stream continuously. For example, member space manager 418 may request a particular stream from head end server 402. In response, head end server 402 may request member space manager 418 to identify itself by supplying a hardware identifier for a given set-top platform 420. After receiving a properly authorized hardware identifier, head end server 402 may encrypt the switching software and transmit the switching software to member space manager 418. Member space manager 418 may decrypt the switching software, install the switching software and tune in the desired stream. Consequently, communication between member space manager 418 and head end server 402 prevents unauthorized users from utilizing transmitted information.

In one or more embodiments, member space manager 418 may tune in a particular stream using dynamic signaling. In dynamic signaling, member space manager 418 maintains the knowledge regarding which particular stream a communication is related to. Additionally, each communication may use a particular encryption scheme. Thus, member space manager 418 maintains the knowledge regarding what the encryption/decryption key is for a particular communication with head end server 402. For example, in one or more embodiments, head end server 402 may maintain objects for a given stream and the member space manager's software object maintains the knowledge regarding which object in head end server 402 the member space manager object is communicating with. The member space manager object may also maintain the knowledge regarding what the encryption/decryption key is for a particular communication with head end server 402. In such an embodiment, unauthorized access is more difficult because an unauthorized user would have to determine what object in head end server 402 the unauthorized user is communicating with and must also determine what the encryption key is for the particular communication.

According to one or more embodiments, switching software may be transmitted at regular or irregular intervals. Consequently, just when an unauthorized user has managed to determine the switching algorithm/pattern for a given stream, the new switching pattern will force the unauthorized user to attempt to determine the new switching pattern.

As described above, set-top platform 420 and member space manager 418 provide the ability to translate or tune into a particular channel or stream of information at a given time. Consequently, there is no specific assigned frequency for a given stream. However, in one or more embodiments of the invention, certain streams or channels may be restricted to a specific frequency with remaining frequencies on the spectrum available for switching. For example, a cable company may want to distribute a certain subset of channels to all users in its area (e.g., NBC, ABC, CBS, and FOX) for free. Consequently, each of those particular channels may be tied to a specific frequency. Any additional channels or programs broadcast by the cable company can then use the switching software as described above by utilizing remaining frequencies available on the broadcast medium. To select a desired channel or stream of information, the end user may select a virtual channel instead of a number that corresponds to a specific frequency. Thus, the end user merely selects NBC, ESPN, or PAY PER VIEW 1 instead of channel 4, 28, or 75. All other transactions, including frequency switching and communication with head end server 402 are transparent to the user.

In accordance with one or more embodiments as described above, instead of encrypting or scrambling information, a stream of information is transmitted on varying frequency bands. Consequently, information regarding where in the spectrum of transmitted signals a stream will appear are encrypted instead of encrypting the stream itself. Thus, a method and apparatus for controlling access to information over a network transparently to an end user has been described in conjunction with one or more specific embodiments. The invention is defined by the claims and their full scope of equivalents.

The invention claimed is:

1. A method for controlling access to a continuous stream of a content transmitted over a plurality of communication paths, the method comprising:
   transmitting from a server a plurality of notifications for determining a sequence of transmission of said continuous stream of said content via a plurality of communication paths;
   obtaining by a client said plurality of notifications;
   transmitting from said server said continuous stream of said content via said plurality of communication paths according to said sequence of transmission; and
   obtaining by said client said continuous stream of said content by automatically switching communication paths in accordance with said sequence of transmission of said content based on said plurality of obtained notifications.

2. The method of claim 1, wherein said plurality of notifications are transmitted from said server at irregular intervals.

3. The method of claim 1, wherein said sequence of transmission of said content determines which communication paths contain which parts of said continuous stream of said content at a given time.

4. The method of claim 1, wherein said plurality of notifications are each encrypted prior to transmission from said server.

5. The method of claim 4, wherein said client comprises a descrambler for decrypting said plurality of notifications and wherein said plurality of encrypted notifications are decrypted by said descrambler prior to said obtaining by said client said continuous stream of said content.

6. The method of claim 4, wherein said continuous stream of said content is not encrypted prior to transmission on said plurality of communication paths.

7. The method of claim 1, further comprising viewing said continuous stream of said content via said client without being aware of said automatically switching of said communication paths.

8. The method of claim 1, wherein said switching of said communication paths prevents a non-authorized viewer from viewing said continuous stream of said content.

9. The method of claim 1, wherein said each of said plurality of communications paths is a frequency, and wherein said automatically switching communications paths includes changing a frequency over which said content is transmitted.

10. A method for controlling access to a content having a plurality of parts transmitted over a plurality of communication paths, the method comprising:
    transmitting an encrypted notification of a communication path on which a part of said content will be transmitted at a given time, wherein said encrypted notification comprises an indication of said given time;
    transmitting said part of said content on said communication path at said given time;
    transmitting another encrypted notification of another communication path on which another part of said content will be transmitted at another given time, wherein said another encrypted notification comprises an indication of said another given time; and
    transmitting said another part of said content on said another communication path at said another given time.

11. The method of claim 10, wherein said transmitting said another encrypted notification and said transmitting said another part of said content are repeated until all parts of said content have been transmitted.

12. The method of claim 10, wherein said content comprises a continuous stream of an individual television program.

13. The method of claim 10, wherein said plurality of notifications are transmitted at irregular intervals.

14. The method of claim 10, further comprising viewing said plurality of parts of said content via an authorized client, wherein each of said plurality of notifications is decrypted at said authorized client prior to transmission of said corresponding part of said content.

15. The method of claim 14, wherein said plurality of parts of said content are not encrypted prior to transmission on said plurality of communication paths.

16. The method of claim 10, further comprising viewing said plurality of parts of said content via a client that automatically switches to said communication path and to said another communication path based on said plurality of notifications.

17. The method of claim 10, wherein said transmitting said part of said content on said communication path and said transmitting said another part of said content on said another communication path prevent a non-authorized viewer from viewing said plurality of parts of said content.

18. A method for controlling access to a content having a plurality of parts transmitted over a plurality of communication paths, the method comprising:

transmitting a notification of a communication path on which a part of said content will be transmitted at a given time from a server to a client, wherein said notification comprises an indication of said given time;

switching automatically by said client of said communication path;

transmitting said part of said content on said communication path at said given time to said client;

viewing said part of said content on said communication path via said client;

transmitting another notification of another communication path on which another part of said content will be transmitted at another given time from said server to said client, wherein said another notification comprises an indication of said another given time;

switching automatically by said client of said another communication path;

transmitting said another part of said content on said another communication path at said another given time to said client; and viewing said another part of said content on said communication path via said client.

19. The method of claim 18, wherein said transmitting said another notification, said automatic switching by said client of said another communication path, said transmitting said another part of said content, and said viewing said another part of said content are all repeated until all parts of said content have been transmitted.

20. The method of claim 18, wherein said content comprises a continuous stream of an individual television program.

21. The method of claim 18, wherein said plurality of notifications are transmitted at irregular intervals.

22. The method of claim 18, wherein said plurality of notifications are each encrypted prior to transmission from said server.

23. The method of claim 22, wherein said plurality parts of said content are not encrypted prior to transmission from said server.

24. The method of claim 18, wherein said transmitting said part of said content of said communication path, said automatically switching to said communication path, said transmitting said another part of said content on said another communication path, and said automatically switching to said another communication path prevent a non-authorized viewer from viewing said plurality of parts of said content.

25. A system for controlling access to a content comprising:

a plurality of communication paths;
a server;
a plurality of notifications for determining a sequence of transmission of a content having a plurality of parts via said plurality of communication paths; and
a client coupled to said server via said plurality of communication paths;
wherein said plurality of notifications are transmitted from said server to said client;
wherein said plurality of parts of said content are transmitted from said server over said plurality of communication paths in accordance with said sequence of transmission; and wherein said client obtains said plurality of parts of said content by automatically switching communication paths in accordance with said sequence of transmission of said content based on said plurality of obtained notifications.

26. The system of claim 25, wherein said plurality of notifications are transmitted from said server at irregular intervals.

27. The system of claim 25, wherein said sequence of transmission determines which communication paths contain which parts of said content at a given time.

28. The system of claim 25, wherein said plurality of notifications are each encrypted prior to transmission from said server and wherein said plurality of notifications are decrypted at said client.

29. The system of claim 28, wherein said plurality of parts of said content are not encrypted prior to transmission from said server.

30. The system of claim 28, wherein said content comprises a continuous stream of an individual television program.

31. The system of claim 25, wherein each of said plurality of communication paths is a frequency, and wherein said switching communications paths includes switching a frequency over which said content is transmitted.

32. A system for controlling access to a content comprising:

a content having a plurality of parts;
a plurality of communication paths;
a server; and
a plurality of encrypted notifications, each of said plurality of encrypted notifications notifying a client of a communication path on which a corresponding part of said content will be transmitted at a given time, and each of said plurality of encrypted notifications comprising an indication of said respective given time;
wherein said server repeatedly transmits an encrypted notification of said plurality of notifications until all parts of said content have been transmitted.

33. The system of claim 32, wherein said content comprises a continuous stream of an individual television program.

34. The system of claim 32, wherein said plurality of notifications are transmitted from said server at irregular intervals.

35. The system of claim 32, further comprising a client for obtaining said plurality of parts of said content and wherein each of said plurality of notifications is decrypted prior to said client obtaining said corresponding part of said content.

36. The system of claim 35, wherein said plurality of parts of said content are not encrypted prior to transmission from said server.

37. The system of claim 35, further comprising a client for obtaining said plurality of notifications and wherein said client obtains said plurality of parts of said content by automatically switching communication paths in accordance with a sequence of transmission of said content based on said plurality of obtained notifications.

38. A system for controlling access to a content comprising:

an individual television program having a plurality of parts;
a plurality of communication paths;
a selected client; and
a server coupled to said client via said plurality of communication paths, said server transmitting a notification to said client of a communication path of said plurality of communication paths on which a part of said program will be transmitted at a given time and transmitting another notification to said client of another communication path of said plurality of communication paths on which another part of said program will be transmitted at another given time, wherein said notification comprises an indication of said given time, and wherein said another notification comprises an indication of said another given time;

wherein said client automatically switches to said communication path at said given time and automatically switches to said another communication path at said another given time;

wherein said plurality of notifications are transmitted from said server to said client at irregular intervals; and wherein said plurality of notifications are each encrypted at said server.

* * * * *